United States Patent [19]

Goward

[11] Patent Number: 4,908,927
[45] Date of Patent: Mar. 20, 1990

[54] ASSEMBLY OF AN END FITTING AND AN ELONGATE ARTICLE

[75] Inventor: Stanley H. Goward, Salisbury, England

[73] Assignee: BTR plc, United Kingdom

[21] Appl. No.: 262,292

[22] Filed: Oct. 25, 1988

[30] Foreign Application Priority Data

Oct. 28, 1987 [GB] United Kingdom ............... 8725298

[51] Int. Cl.4 .......................................... B23Q 17/00
[52] U.S. Cl. .................................. 29/407; 29/890.144
[58] Field of Search ................. 29/407, 157 R, 157 C; 138/104, 36

[56] References Cited

U.S. PATENT DOCUMENTS 4,561,838 12/1985 Olsen et al. .

FOREIGN PATENT DOCUMENTS 2105248 3/1983 United Kingdom .

Primary Examiner—Timothy V. Eley
Attorney, Agent, or Firm—Stevens, Davis, Miller & Mosher

[57] ABSTRACT

To facilitate eventual confirmation that an elongate article secured within an end fitting was fully inserted into the end fitting during assembly, the outer surface of the elongate article is provided with a two-part marking prior to assembly with the end fitting. The two-part marking is applied to the elongate article at a predetermined axial position from the end of the article such that in the case of a satisfactory assembly, in which for example the article is fully inserted in the end fitting, one part of the marking is exposed and another part is concealed. The exposed part serves to confirm that the article was marked prior to assembly with the end fitting and at least partial concealment of the other part of the marking confirms that the article extends sufficiently within the end fitting. The invention is especially suitable for confirming that in a hose assembly the end of a hose fully extends within the end fitting.

11 Claims, 1 Drawing Sheet

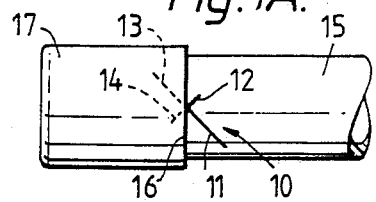
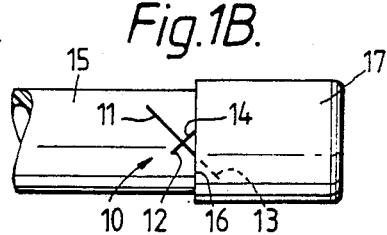
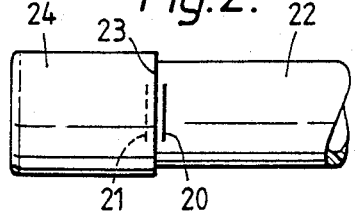
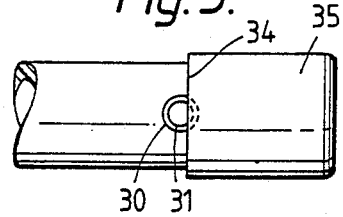
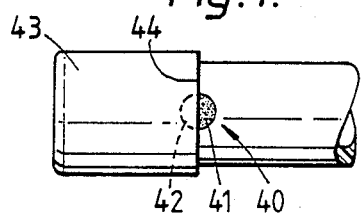
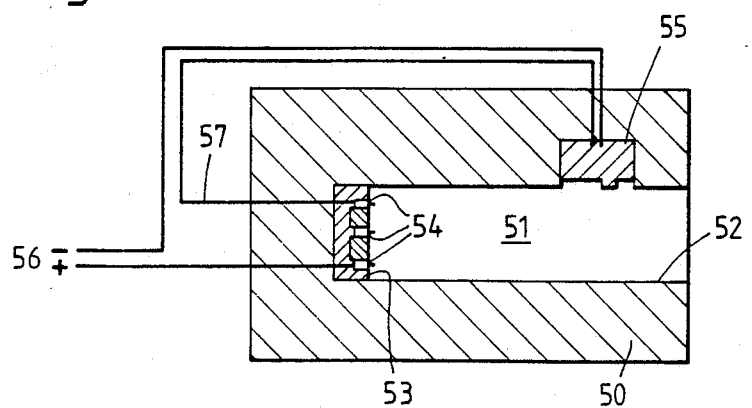

ASSEMBLY OF AN END FITTING AND AN ELONGATE ARTICLE

This invention relates to an improved assembly of an end fitting and an elongate article, a method of manufacture of an assembly of an elongate article and an end fitting and apparatus for use in performing said method.

The invention relates in particular, though not exclusively, to an improved hose assembly comprising a hose and an end fitting, a method of manufacture of an assembly of a hose and an end fitting and apparatus for use in performing said method.

The strength of attachment of an end fitting to a hose depends inter alia on whether the end of the hose has been fully inserted axially into the space provided for the hose within the end fitting. This is believed to be important especially in the case of swaged high pressure hose assemblies in which the hose contains an embedded reinforcement layer and even more so when such an assembly operates at above ambient temperature. It has been found that even if only a small space within an end fitting remains unoccupied by the hose, as a result of the hose not having been fully inserted, there is a very significant reduction in strength of the assembly at least in the case of high pressure hose assemblies used at elevated temperatures. It is believed this may arise from a gradual flow of polymeric material of the hose from a position of direct compression between the reinforcement and a part of the end fitting to any vacant position elsewhere within the end fitting and at which it is not acted upon by the reinforcement, the grip on the reinforcement thereby being gradually reduced.

Commonly the materials selected for constructing a hose end fitting in order to achieve good strength are non-transparent and when assembled with a hose the end fitting totally envelops and conceals an end portion of the hose. In consequence it is not possible to inspect the completed hose assembly visually to check that the hose end fully occupies the space provided therefor within the fitting.

To enable a non-destructive check to be made on whether a hose and an end fitting have been assembled properly it is known to provide one or more window-like openings in an end fitting, typically in a ferrule part of an end fitting. This technique involves the cost of providing a suitable window-like opening in the end fitting and also has the disadvantage of potentially weakening the assembly.

It has also for long been known that the hose outer surface may be marked, e g by means of chalk, crayon or adhesive tape at a position to which the outer part of the end fitting is intended to reach when a proper assembly is made. The resultant position of the mark relative to the end fitting or alternatively the total concealment of the mark by the end fitting is then relied upon to indicate whether or not a proper assembly has been made. In the case of a mark which is exposed in the final assembly there is the problem of determining whether its spacing from the end fitting is within an acceptable tolerance. In the case of a final assembly in which the mark is intended to be concealed by the end fitting there is the risk that any oversight in applying a mark to the hose results in a false indication that the resulting assembly is formed satisfactorily. Additionally, irrespective of whether or not a mark is intended to be concealed by the end fitting there is much scope for error in correctly positioning the mark relative to the end of the hose.

The problem of ensuring proper axial insertion into an end fitting is not confined to hose assemblies and arises also in connection with the insertion into end fittings of other types of elongate articles. For example in the case of high tension steel ropes swaged into end fittings, proper axial insertion is necessary to attain a desired joint strength, while in the case of electrical conductors secured within an end fitting full insertion can be necessary to attain an adequate level of electrical conductivity.

The present invention seeks to provide an improved assembly of an end fitting and an elongate article such as a hose wherein the satisfactory axial insertion of the elongate article into the end fitting may be checked readily and accurately, and an improved method and apparatus for the manufacture of an assembly of an elongate article and an end fitting.

In accordance with one of its aspects the present invention provides an assembly comprising an end fitting and an elongate article having applied thereto an assembly marking part of which is concealed by the end fitting and part of which remains exposed when an end of the elongate article is fully fitted within the end fitting.

The invention also provides an elongate article, for example a hose, having an end region which bears an assembly marking having two parts which are distinguishable from one another and which lie axially at different but predetermined positions from an end of the article.

The assembly marking is to lie at a predetermined distance from an end of the elongate article and it is envisaged that it will be distinct from product markings applied to the article during manufacture to indicate for example origin, type or size of the article.

When, however, the assembly is formed by a method in which the elongate article is cut with required accuracy at predetermined positions relative to preformed or pre-applied product markings the use of a product marking as an assembly marking is possible.

In general it is preferred that the assembly marking is of a permanent nature.

In accordance with another of its aspects the present invention provides a method for the manufacture of an assembly comprising an elongate article, for example a hose, and an end fitting wherein an assembly marking is applied to the elongate article at a predetermined axial position relative to an end of the elongate article whereby at least a part of the marking is positioned to remain exposed when the elongate article and end fitting are assembled satisfactorily, assembling the elongate article and end fitting, and then comparing the axial position of the assembly marking with a marking datum arranged at a prescribed distance from an end of the assembly, at least one of the assembly marking and marking datum being of a kind comprising two parts which are distinguishable from one another and at least a part of the other of said assembly marking and marking datum lying in a prescribed axial relationship relative to said two parts only when the elongate article and end fitting are satisfactorily assembled.

In a preferred method the assembly marking applied to the elongate article is of the kind comprising two marking parts, said marking being positioned along the length of the article such that in a properly formed assembly one marking part is exposed and the other is covered by the end fitting. It will be appreciated that in this method the inward end of the end fitting acts as the marking datum.

For convenience of use of the inward end of the fitting as a marking datum all circumferential positions of the inward end should lie at the same distance from the end of the assembly, i e the end fitting should be of uniform length when considered in any cross-sectional plane containing the longitudinal axis of the fitting. The assembly marking on the elongate article therefore need not extend around the whole circumference of that article.

Alternatively, however, the inward end of an end fitting may be profiled, for example to have a castellated or simple notched profile, and in that case it is preferred that the assembly marking on the elongate article be circumferential so as to avoid the need otherwise to rotate the end fitting during assembly to bring a selected part of the circumference of the end fitting into alignment with a circumferentially discontinuous assembly mark.

One example of a suitable two-part assembly mark is a cross, with the four limbs thereof arranged to lie obliquely relative to the length of the elongate article. By selectively positioning the cross relative to the end of the elongate article it may be arranged that if two limbs are exposed the assembly is satisfactory whilst if more than two limbs are exposed there will be an indication that the elongate article does not extend fully within the end fitting and that therefore the assembly is unsatisfactory.

The assembly marking may be of a kind visible to the naked eye whether under natural or artificial light, e.g. ultra-violet light, or it may be of a kind invisible to the naked eye and require the use of special detection means to determine its presence and position. In the first case the assembly mark may be formed for example by an applied paint, tape or small indentation in the surface of the elongate article and may be detected by human sight or for example electronically by photo-detection. In the second case a marking invisible to the naked eye but detectable by sensing means may be employed, for example an invisible pattern formed by a selectively conductive coating and detectable electronically by sensing means which contacts the marking.

The assembly marking alternatively may be of a kind which does not need to comprise two marking parts. In that case the marking datum should be of a kind comprising two parts, which may be marking type parts, so that when the end of a completed assembly is positioned in a prescribed manner relative to the marking datum a check may be made to ensure, for evidence of a satisfactory assembly, that, for example, a single assembly marking on the elongate article lies between two marking datum parts which are axially spaced apart in the direction of the length of the assembly by a distance related to the size of the assembly marking and permitted tolerances. The correctness of the assembly may then be determined by establishing whether, for example, the assembly marking lies wholly between the two parts of the datum marking.

A two-part marking datum, of a type having two marking type parts, may be provided by the end fitting, its inner end being notched or otherwise formed so as to define at least two datum portions lying at different axial distances from the outer end of the end fitting, e.g. the top and base of a notch. The correctness of an assembly may then be determined by establishing whether, for example, the assembly marking lies, axially, wholly between the two datum positions of the end fitting.

A two-part marking datum alternatively may be provided by sensing means independent of an assembly of an end fitting and elongate member and positionable at a prescribed distance from the end of the assembly. The sensing means may comprise two sensors axially spaced relative to the longitudinal axis of the elongate article and they may be arranged to result in an indication of a satisfactory assembly only when, for example, each sensor detects the presence of the assembly marking thereunder; if one sensor does not detect the presence of the assembly marking there will be an indication of an unsatisfactory assembly.

Suitable visible assembly markings will have shape or other characteristics which can be judged visually as having a fairly precise lengthwise relationship when compared with the relative lengthwise position of the marking datum. A series of assembly markings, for example in the form of a scale, may be provided spaced lengthwise along the elongate article at predetermined positions relative to the end of the article; this is particularly useful when a stock of lengths of elongate articles of a particular size and type is likely to be required to have fitted thereto end fittings of any of a range of axial lengths. The scale may comprise a series of different color assembly markings, the color of the marking at any one position corresponding to a color marking on a particular size of end fitting for which that assembly marking is intended to indicate a satisfactory assembly.

If in the final assembly the assembly marking does not serve to show in a visible manner that the assembly is satisfactory, for example if the assembly marking is a one-part type and the end fitting does not serve as a two-part marking datum or if the marking is invisible, it is preferred that after comparison of the assembly marking with a marking datum the assembly, if satisfactory, is given a permanent verification mark.

In accordance with a further of its aspects the present invention provides apparatus for applying an assembly marking to an elongate article, for example a hose, comprising a housing to receive an end portion of an elongate article, sensing means to sense whether an end of the article is properly positioned in the housing and marking means operable to apply a marking to the article at a predetermined axial position relative to the end of the elongate article, the marking means being operable only when the sensing means senses that an end of the elongate article is properly positioned axially in the housing.

Preferably the sensing means comprises two or more sensors for sensing the longitudinal position of the end of the article relative to the housing at two or more circumferentially spaced positions at the end of the article. By arranging that each sensor must sense that a respective part of the end of the article is properly positioned before actuating or allowing actuation of the marking means it is ensured that any length of elongate article which does not have a properly, typically squarely, cut end does not become marked with an assembly marking. This is particularly advantageous in the case of hose and avoids the risk of unsatisfactory assemblies in which although the hose has been fully inserted into an end fitting, a localized absence of hose material at an end region, because of improper cutting, might permit the earlier referred undesirable movement of hose material especially during subsequent use in high temperature and pressure situations.

In a preferred form of apparatus the housing has a cylindrical recess to receive the end portion of an elongate article, e g a tubular elongate article such as a hose, and at the base of the recess three or more sensors, such as micro-switches, for sensing the presence of the end of the article at each of three circumferentially spaced positions.

Embodiments of the invention will now be described, by way of example only, with reference to the accompanying diagrammatic drawings in which:

FIGS. 1 to 4 each show different assembly markings on a hose assembly, and

FIG. 5 is a longitudinal sectional view of apparatus in accordance with the present invention.

FIG. 1 shows at each of illustrations 1A and 1B a two-part hose assembly marking 10 in the form of a cross "X" having four limbs 11,12,13,14, two of which 11,13 are longer than the others 12,14. It is positioned axially relative to the end of the hose 15 such that in a satisfactory assembly only one part of the cross, namely two inward limbs 11,12 are exposed, visually indicating a tick as shown in illustration 1A against a marking datum defined by the inward end 16 of a swaged end fitting 17. In an unsatisfactory assembly as shown in illustration 1B a cross marking is exposed.

FIG. 2 shows a two-part assembly marking comprising a pair of lines 20,21 axially spaced and extending over a small part of the circumference of the hose 22. The inward end 23 of the end fitting 24 acts as a marking datum. When only one part of the assembly marking, namely line 20, is visible the assembly is satisfactory as shown in FIG. 2. If both lines were visible the assembly would be unsatisfactory.

FIG. 3 shows a two-part assembly marking in the form of a pair of concentric circles 30,31 one of which is smaller than the other. The end 34 of the end fitting 35 acts as a marking datum. For a satisfactory assembly it may be provided that the inner circle is to be crossed by the marking datum 34. In the case of this assembly marking the part of the marking between the hose end and inner circle is the part that is not exposed if the assembly is satisfactory.

FIG. 4 shows a two-part assembly marking 40 comprising as one part a green color zone 41 and as the other part a red color zone 42, with the inward end 44 of the hose end fitting 43 again acting as a marking datum. For a satisfactory assembly it may be required that at least some of the green but none of the red zone shall be visible.

In the apparatus of FIG. 5 a steel housing 50 is formed with a cylindrical recess 51 open at one end 52 and having a base 53 perpendicular to the length of the recess The recess is dimensioned to receive the end of a hose of a specific external diameter or within a range of external diameters.

Provided in the base are three micro-switches 54 arranged uniformly circumferentially spaced and at positions near to the sidewall of the recess so as to be engaged by the end of the wall of a hose inserted in the recess.

Near to the open end 52 of the recess an electrically operated marking unit 55 is mounted for applying an assembly mark to a hose in the recess.

The micro-switches are arranged electrically in series such that power is communicated from a source 56 to the wire 57 leading to the marking unit only when each of the micro-switches is engaged by a hose end.

The marking unit optionally may be mounted in a slot extending in the direction of the length of the recess to enable it to be positioned at a selected spacing from the base dependent on the required position of the assembly marking relative to the end of the hose. Alternatively the marking unit may be fixed and the micro-switches may be mounted on an axially movable base member.

The present invention readily enables due regard to be given to dimensional tolerance conditions and differences of discernment standards by different operators as well as allowing rapid determination of whether a good quality assembly has been made.

What I claim is:

1. Method of manufacture of an assembly comprising an elongate article and an end fitting wherein an assembly marking is applied to the elongate article at a predetermined axial position relative to an end of the elongate article whereby at least a part of the marking is positioned to remain exposed when the elongate article and end fitting are assembled satisfactorily, assembling the elongate article and end fitting, and then comparing the axial position of the assembly marking with a marking datum arranged at a prescribed distance from an end of the assembly, one of the assembly marking and marking datum being of a kind comprising two parts which are distinguishable from one another and the other of said assembly marking and marking datum lying in a prescribed axial relationship relative to said two parts only when the elongate article and end fitting are satisfactorily assembled.

2. Method according to claim 1 wherein there is applied to the elongate article an assembly marking of a kind comprising two marking parts, said marking parts being positioned along the length of the article such that in a properly formed assembly one marking part is exposed and the other is covered by the end fitting.

3. Method according to claim 2 wherein there is applied to the elongate article an assembly marking comprising two marking parts arranged in the shape of a cross each limb of which lies obliquely relative to the length of the article.

4. Method according to claim 1 wherein use is made of a marking datum of a kind comprising two marking parts.

5. Method according to claim 4 wherein said two marking parts are provided by a contoured inner end of the end fitting.

6. Method according to claim 4 wherein sensing means independent of the assembly is provided with said two marking parts of the marking datum and is positionable at a prescribed distance from the end of the assembly.

7. Method according to claim 6 wherein use is made of sensing means comprising two sensors axially spaced relative to the longitudinal axis of the elongate article.

8. Method according to claim 1 wherein the elongate article is provided with an assembly marking the color or other characteristics of which correspond with the color or other characteristics of an identification marking carried by the end fitting intended for assembly with that elongate article.

9. Method according to claim 1 wherein subsequent to comparison of the assembly marking with a marking datum the assembly, if satisfactory, is given a permanent verification mark.

10. Method according to claim 1 wherein the end fitting is deformable and is swaged around an end portion of the elongate article to secure the end of the elongate article and the end fitting against relative movement therebetween.

11. Method according to claim 1 wherein the elongate article to which the assembly marking is applied is a hose.

* * * * *